United States Patent Office 3,325,254
Patented June 13, 1967

3,325,254
SYNTHESIS OF DIAMOND
Armando A. Giardini, New Shrewsbury, and John E. Tydings, Keyport, N.J., assignors to the United States of America as represented by the Secretary of the Army
No Drawing. Filed July 29, 1963, Ser. No. 298,507
5 Claims. (Cl. 23—209.1)

The invention described herein may be manufactured and used by or for the Government for governmental purposes without the payment of any royalty thereon.

This invention relates to the synthesis of diamond, and more particularly, to a method of inducing supersaturation of carbon in metal carbon systems subjected to high pressures and temperatures.

The first substantiated synthesis of diamond was announced by the General Electric Company in February of 1955. Shortly thereafter, a second success was reported by the Swedish firm of Allmänna Svenska Elektriska Aktiebolaget (1955). Data on the third independent synthesis, by the U.S. Army Electronics Research and Development Laboratory, was published five years later (Giardini et al., 1960). Thus, within a few years after the first successful attempt, this significant mineral became a routinely producible material.

Since the first successful synthesis of diamond, the nature of the mechanism of diamond formation has been the subject of considerable debate. Several of the experts actively engaged in the field of diamond synthesis have described the mechanism of diamond formation as catalytic when diamond is formed by the reaction of carbon with some intermediate material under high pressure and temperature.

Our research led us to believe that the mechanism of diamond synthesis when a metal-carbon system is subjected to high pressures and temperatures can be better and more properly described as the solution of carbon in a suitable solvent to a state of supersaturation and thermodynamic instability, followed by decomposition with subsequent recrystallization of the precipitated carbon.

After our initial research we conducted numerous other tests to determine whether or not we could verify our theory. The results of these additional tests have convinced us that the mechanism involved in diamond formation from metal-carbon systems subjected to high pressures and temperatures is a process of supersaturation of the carbon relative to the metal followed by a recrystallization of the excess carbon as either graphite or diamond. The carbon recrystallizes as diamond if the temperature and pressure is sufficiently high for diamond stability.

Fortified with this knowledge we realized that the rate of growth of diamond from a metal-carbon system could be greatly increased or the temperature and pressure required to form high quality diamond could be decreased if a method of inducing carbon supersaturation could be devised. We decided to investigate the problem of induced supersaturation and during this investigation we invented a method of chemically inducing carbon supersaturation of metal carbon systems.

Therefore an object of our invention is to induce carbon supersaturation of metal-carbon systems subjected to elevated temperatures and pressures.

Another object of our invention is to provide a method for increasing the rate of growth of diamond from metal-carbon systems.

A further object of our invention is to provide a method for producing high quality diamond at temperatures and pressures lower than those used at the present time to produce diamond of like quality.

A still further object of our invention is to provide a method for producing high quality diamond.

These and other objects will become apparent by reading the following detailed description.

During our investigation of the supersaturation concept, we studied among others, the tantalum-carbon system; the chromium-carbon system; the nickel-carbon system; the platinum-carbon system; the manganese-carbon system; the iron-carbon system; the cobalt-carbon system; and various metal "alloy" combinations of the above mentioned metals along with others such as silver and copper, as well as standard commercial metal compositions such as "Inconel," "Invar," "Monel," and "Stainless Steels" plus carbon.

In any of the above listed systems, carbon that is chemically held by reaction at elevated temperatures and pressures can be made to precipitate out to certain extents either as recrystallized graphite crystals or, providing the ambient pressure and temperature within the reaction cell are of proper intensity for diamond stability, as diamond. The specific cause for local precipitation at any suitable temperature and pressure is the chemical concentration of the element or elements precipitating from the chemical reaction. The concentration must reach a degree of supersaturation to a point of thermodynamic instability for precipitation to initiate. At any given suitable pressure, supersaturation can be brought about thermally. The rate and degree of supersaturation, as well as the point of decomposition and rate of precipitation, are susceptible to control through the variables, temperature, time, and chemical supply (concentration).

In some of the metal-carbon systems listed herein, carbon supersaturation of the system occurs through the formation of a series of metal carbide compounds of increasing carbon content to a point of ultimate carbon accommodation; where, in an environment of an excess carbon (under a suitably elevated temperature and pressure) a chemical breakdown occurs either to a carbide of lower carbon content or completely to the initial metal and carbon. The resulting liberated carbon thereupon crystallizes either as graphite or diamond, the choice being controlled by the local pressure and temperature. An example of this type of reaction series is the manganese-carbon system. In this system, supersaturation to the point of instability and decomposition with subsequent precipitation of the supersaturated ingredient is preceded by the formation first of alpha Mn (to approximately 1.3% dissolved carbon), beta Mn (to 0.4% carbon), then gamma Mn (to 2.0% dissolved carbon), followed by the formation of $Mn_{23}C_6$, then $Mn_3C$, then by $Mn_7C_3$, and finally the highest recoverable carbide yet observed MnC. In the presence of excess undissolved carbon the MnC has been observed to decompose at least to $Mn_7C_3$, with the difference in carbon being liberated as chemically active carbon that is free to recrystallize as either graphite or diamond.

The metal-carbon systems listed above that do not achieve carbon supersaturation through the formation of observable carbides or stoichiometric recoverable carbon compounds can best be described as metal-carbon solutions. An example of this type of metal-carbon systems is the nickel-carbon system. Although it is possible to form a nickel carbide at elevated pressures, the temperature, at any given pressure, required to form this carbide is much higher than the temperature for diamond stability.

We have found that, with the proper control of the variables such as time, pressure, temperature, and chemical concentration, carbon supersaturation can be induced in the metal-carbon solution type systems and in the systems that form carbon compounds by the use of suitable secondary chemical reactions. The secondary chemical reaction is executed in conjunction or coordination with the basic reaction. For example, in a simple solution type system, the relative concentration (saturation) of carbon dissolved relative to the metal can be readily increased by chemically removing a portion of the metal in the form of a chemical composition that is insoluble or chemically inert to the surrounding metal-carbon system.

In several of the metal-carbon systems of the solution type we have found that pyrophyllite [$H_2Al_2(SiO_3)4$] can be used to produce the necessary secondary reaction for induced supersaturation. Specifically, although not exclusively, pyrophyllite can be used with the nickel-carbon system. The reaction of a nickel-carbon system with pyrophyllite, at pressures suitable for diamond formation and at temperatures sufficiently high for the nickel-carbon reaction to initiate, results in the formation of a nickel spinel type compound (a nickel aluminum oxide of fixed composition). The formation of nickel spinel prematurely increases the relative concentration of carbon dissolved relative to the nickel content by permanently removing nickel from the nickel-carbon solution. An early state of carbon supersaturation and precipitation of the excess carbon in the recrystallized form known as diamond is brought about by the permanent removal of the nickel.

Pyrophyllite can also be used to induce supersaturation in some of the metal-carbon systems that tend to form carbides at pressures and temperatures normally used for diamond synthesis. An example of such a system is the cobalt-carbon system. By reacting pyrophyllite with cobalt dissolved in the cobalt-carbon reaction an inert cobalt garnet is formed. The formation of this garnet permanently removes some of the cobalt from the cobalt-carbon system, thereby increasing the carbon content relative to the cobalt.

The principle of induced supersaturation is not limited to the simple metal-carbon systems such as the nickel-carbon and cobalt-carbon systems nor is pyrophyllite the only composition that can be used to produce the required secondary reaction. An example of a complex metal-carbon system in which chromium produces the required secondary reaction is a nickel, iron, chromium alloy having an approximate ratio 15:3:1, plus carbon. In this case a carbide-type compound essentially of the formula $Cr_3C_2$ is formed at elevated temperatures and pressures. The pressure and temperature required to form this carbide are appreciably lower than the pressure and temperature required for carbon supersaturation of a nickel-carbon system. The formation of the carbide at a temperature and pressure lower than that required for carbon supersaturation of a nickel-carbon system creates an increased concentration gradient and diffusion rate of dissolved carbon in the surrounding essentially nickel-carbon system, thereby inducing a premature state of carbon supersaturation in the nickel-carbon system, with subsequent precipitation and recrystallization of excess carbon as diamond.

In all the specific examples given above the temperatures and pressures initially used were those generally recognized as the minimum temperatures and pressures required for diamond formation. For example, the approximate minimum temperatures and pressures for diamond formation from the nickel-carbon and cobalt-carbon system are 1460° C., 55 kilobars and 1450° C., 50 kilobars respectively. At these minimum temperatures and pressures we obtained diamond of higher quality than the diamond that is obtained at the same temperatures and pressures using standard techniques. After our initial tests we increased the temperatures and pressures above the recognized minimums. At these higher temperatures and pressures we obtained diamond of gem quality. Also, by using the method disclosed herein the yield we obtained was higher than the yield we obtained using the well known standard methods. Thus, our invention makes it possible to produce diamond of usable quality at temperatures and pressures that are readily obtainable. This factor alone should lead to improved commercially feasible diamond synthesis.

The specific examples given above are given for purposes of illustration only and are not to be considered as the only metal-carbon systems to which our induced supersaturation method can be applied. Our method has general applicability to metal-carbon systems and elements, compounds or chemical compositions other than those specifically noted can be used for secondary reaction purposes. Thus, it is our intention to be limited only by the scope of the appended claims and not by the specific examples given above.

We claim:
1. In a process for producing high quality diamond comprising: loading into a pressure vessel a mixture of substantially pure carbonaceous material and one material selected from the group consisting of nickel and cobalt; subjecting said mixture to pressures and temperatures greater than the minimum required for diamond formation; cooling the resultant product; and removing said pressure; the improvement which consists of adding in intimate contact with said mixture, prior to subjecting said mixture to said pressures and temperatures, a minor amount of pyrophyllite, said pyrophyllite being added in an amount sufficient to cause chemically induced carbon supersaturation of said carbon-metal mixture by chemical reaction of said pyrophyllite with said carbon-metal mixture.

2. The process as set forth in claim 1 wherein the material selected from said group is cobalt.

3. The process as set forth in claim 2 wherein said pressure is 50 kilobars and said temperature is 1450° centigrade.

4. The process as set forth in claim 1 wherein the material selected from said group is nickel.

5. The process as set forth in claim 4 wherein the pressure is 55 kilobars and the temperature is 1460° centigrade.

References Cited
UNITED STATES PATENTS

| | | | |
|---|---|---|---|
| 2,947,609 | 8/1960 | Strong | 23—209.1 |
| 2,992,900 | 7/1961 | Bovenkerk | 23—209.1 |
| 3,148,161 | 9/1964 | Wentorf et al. | 252—502 |

OSCAR R. VERTIZ, *Primary Examiner.*

E. J. MEROS, *Assistant Examiner.*